(12) United States Patent
Ho

(10) Patent No.: US 7,164,850 B1
(45) Date of Patent: Jan. 16, 2007

(54) PORTABLE BARBECUE BOX

(76) Inventor: Wei-Teh Ho, 10F., No. 380, Sec. 1, Fu-Hsing S. Rd., Taipei (TW)

( * ) Notice: Subject to any disclaimer, the term of this patent is extended or adjusted under 35 U.S.C. 154(b) by 0 days.

(21) Appl. No.: 11/288,207

(22) Filed: Nov. 29, 2005

(51) Int. Cl.
*F24C 7/00* (2006.01)
(52) U.S. Cl. .................................. 392/407; 392/411
(58) Field of Classification Search ................ None
See application file for complete search history.

(56) References Cited

U.S. PATENT DOCUMENTS

| | | | | |
|---|---|---|---|---|
| 4,372,199 A | * | 2/1983 | Brown et al. ................... | 99/341 |
| 5,001,971 A | * | 3/1991 | Beller ........................ | 99/421 H |
| 5,168,798 A | * | 12/1992 | Kristofich et al. ......... | 99/421 H |
| 5,172,628 A | * | 12/1992 | Pillsbury et al. ........... | 99/421 H |
| 5,197,379 A | * | 3/1993 | Leonard, Jr. ................. | 99/446 |
| 5,715,744 A | * | 2/1998 | Coutant ...................... | 99/421 H |
| 6,047,633 A | * | 4/2000 | Khaytman ................. | 99/421 V |
| 6,272,975 B1 | * | 8/2001 | Usherovich .................. | 99/331 |
| 6,658,991 B1 | * | 12/2003 | Backus et al. ................ | 99/395 |
| 6,837,151 B1 | * | 1/2005 | Chen ........................ | 99/421 H |

* cited by examiner

*Primary Examiner*—Thor Campbell

(57) ABSTRACT

A portable barbecue box includes a cooking chamber, a heating tube a plurality of sticks, a mechanical compartment and a motor. The heating tube is disposed inside the cooking chamber. A plurality of slots are provided on one side of the chamber so as to hold the sticks in place. The motor, disposed in the compartment, may be turned on so that the sticks with food on may be rotated around. The output axle of the motor is connected with a set of cogwheels, which includes a plurality of cogwheels. The cogwheels may mesh with each other or a transmission wheel may be provided between each pair of the cogwheels. A positioning piece is provided on each cogwheel, and a positioning hole is centrally provided on each positioning piece. Whence, the proximal end and distal end of each stick may be positioned in a slot and a positioning hole, respectively.

5 Claims, 6 Drawing Sheets

PORTABLE BARBECUE BOX

BACKGROUND OF THE INVENTION

1. Field of the Invention

The invention generally relates to a portable barbecue box. More particularly, the invention relates to a portable barbecue box that may be used to barbecue or cook steaks, beef, hotdogs, burgers and other kinds of food and that is easy to clean, environmentally friendly and economical.

2. Description of the Prior Art

In the contemporary society, with the fast development of urbanization, work and daily life become ever more stressful. People start to put more emphasis on their leisure activities and hope to use leisure activities to balance their life.

Among the leisure activities, barbecue activity is a popular one. Via the process of barbecue activity, while enjoying the delicious food, people may become closer.

In the traditional barbecue activity, we have to prepare food, iron frame, charcoal, etc. If something goes wrong, such barbecue activity may be greatly affected and quarrels may occur between friends.

In addition, the use of improper barbecue devices may create a lot of garbage, grease and ash, which pollute our environment, and may even cause fires.

In this invention, a portable barbecue box is disclosed. The portable barbecue box of the present invention is compact, easy to use, easy to carry around and environmentally friendly. It may be used in the outdoor and in our home. After the inventor put in a lot of effort in the subject and experiments have been carried out, the inventor has successfully come up with the portable barbecue box of the present invention.

SUMMARY OF THE INVETION

The present invention is to provide a portable barbecue box that is easy to use so that food may be barbecued easily and the pleasure of a barbecue activity may be enhanced.

Another, the present invention is to provide a portable barbecue box that is compact and easy to carry around so that it may be used in a recreational vehicle and an SUV as well as in our home, Third, the present invention is to provide a portable barbecue box that is environmentally friendly and allows grease and ash to be gathered and discarded.

The portable barbecue box of the present invention comprises a cooking chamber, a heating tube, a plurality of sticks, a mechanical compartment and a motor. The heating tube is disposed inside the cooking chamber. A plurality of slots are provided on one side of the chamber so as to hold the sticks in place so that food may be put on the sticks. The motor, disposed in the compartment, may be turned on so that the sticks with food may be rotated around. The output axle of the motor is connected with a set of cogwheels, which includes a plurality of cogwheels. The cogwheels may mesh with each other or a transmission wheel may be provided between each pair of the cogwheels. A positioning piece is provided on each cogwheel, and a positioning hole is centrally provided on each positioning piece. Whence, the proximal end and distal end of each stick may be positioned in a slot and a positioning hole, respectively; now, the motor may be turned on to rotate the sticks.

DETAILED DESCRIPTION OF THE PREFERRED EMBODIMENT

Figure 1:
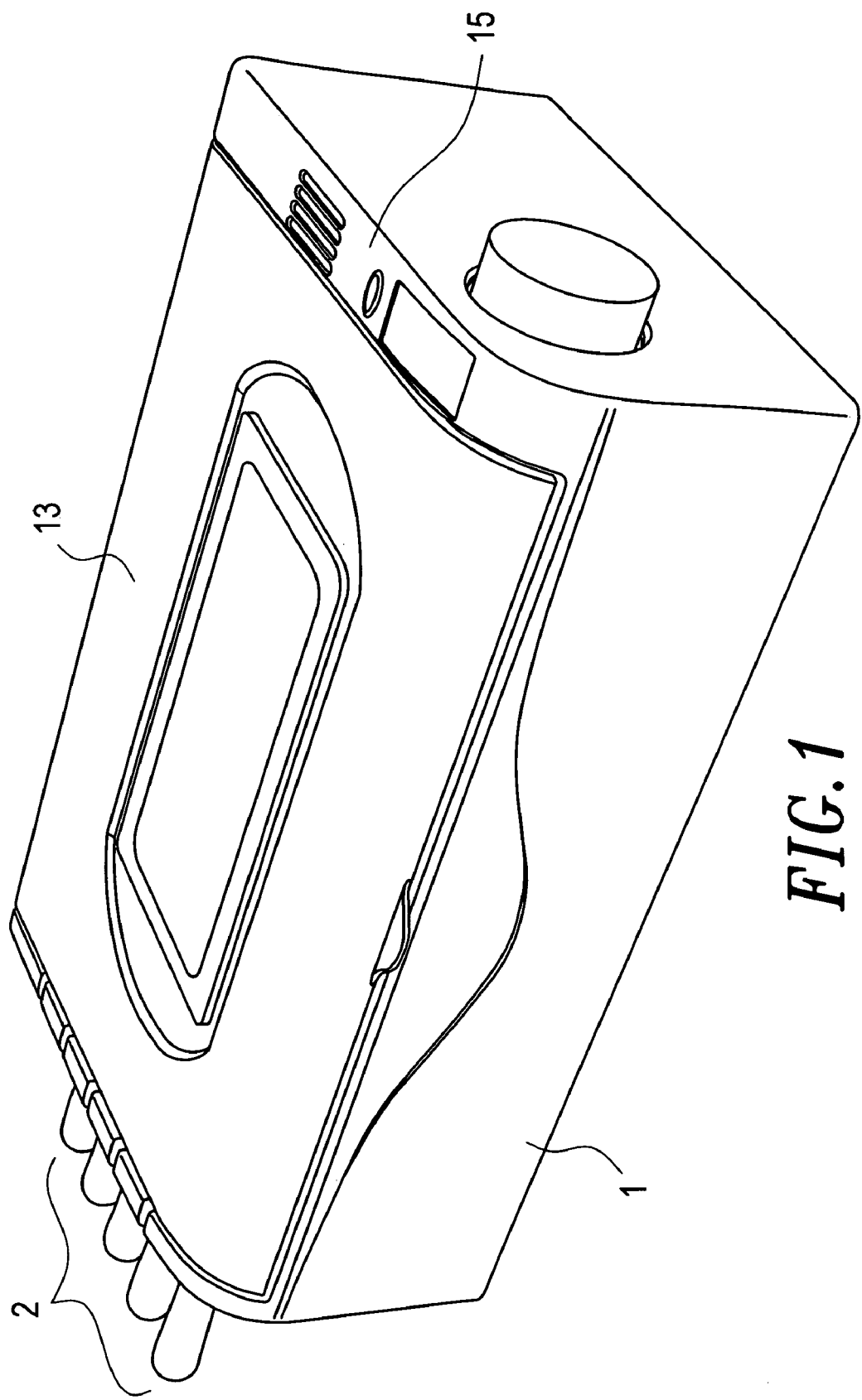
FIG. 1 is a perspective view of the portable barbecue box of the present invention with the cover closed.
Figure 2:
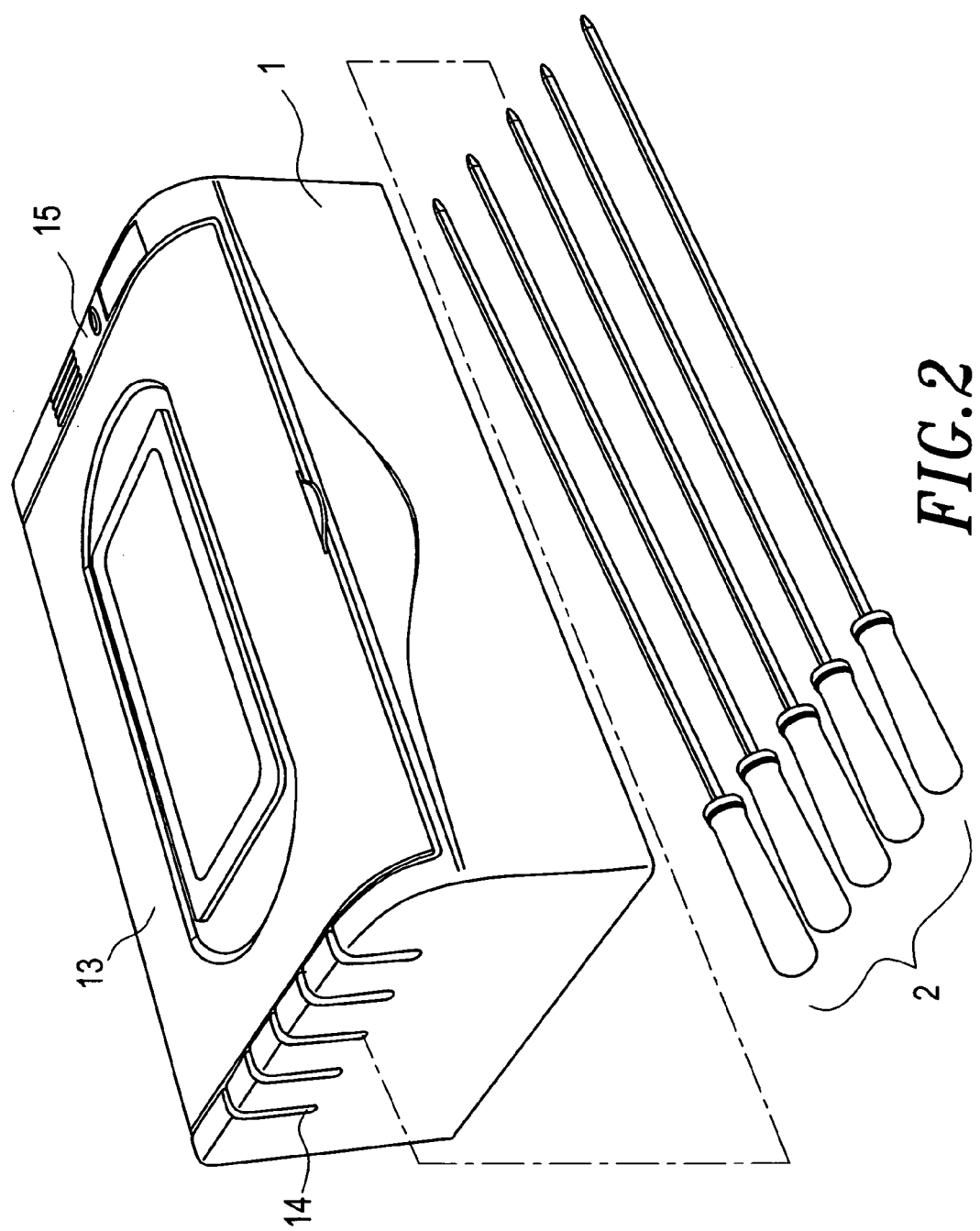
FIG. 2 is a perspective view of the portable barbecue box of the present invention, showing the barbecue box and the sticks.
Figure 3:
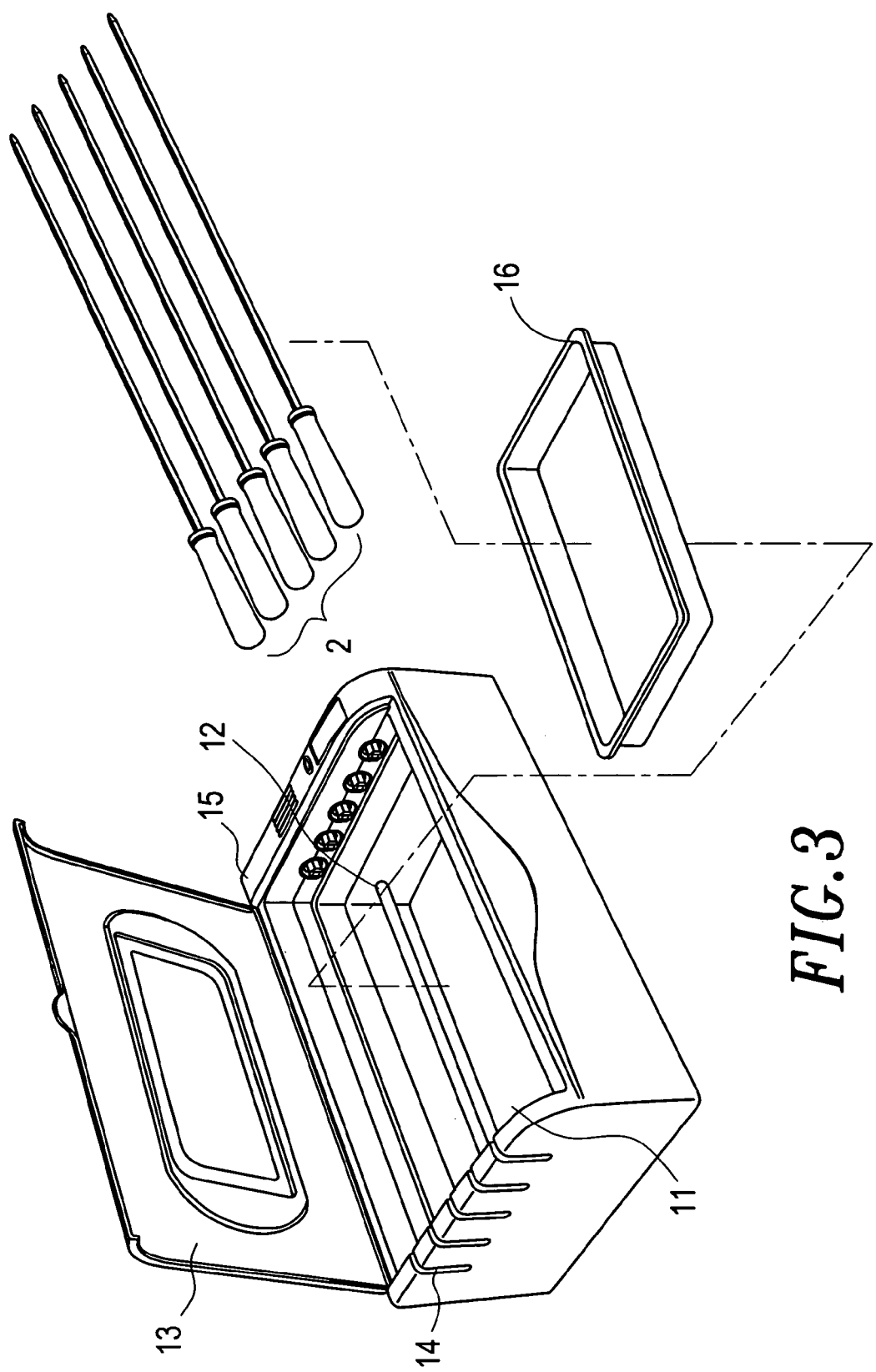
FIG. 3 is a perspective view of the portable barbecue box of the present invention with the cover open, showing the inside of the box, the sticks and the pan.
Figure 4:
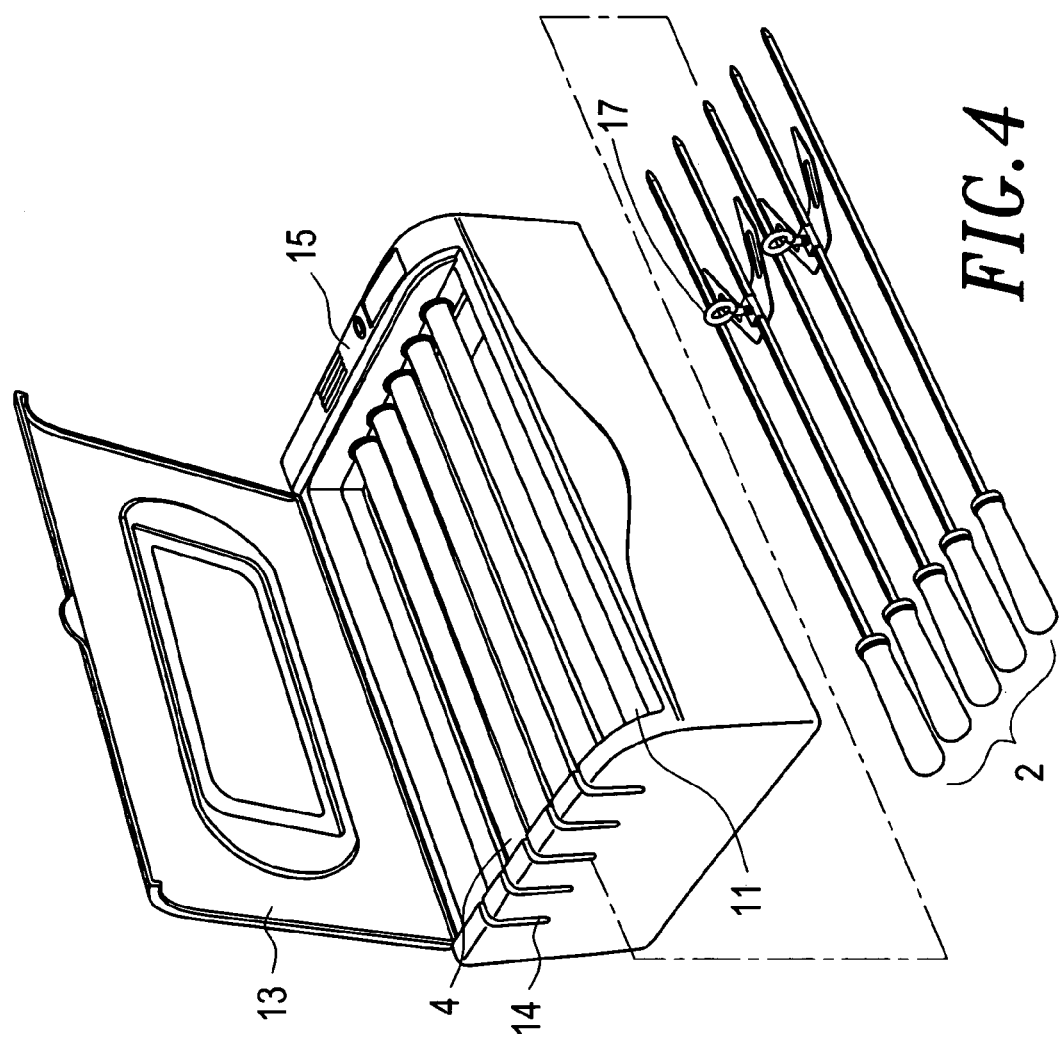
FIG. 4 is another perspective view of the portable barbecue box of the present invention with the cover open, showing the inside of the box, the sticks, the fastening pieces and the cylindrical rollers.

Please refer to FIGS. 1 to 4. The portable barbecue box 1 of the present invention comprises a cooking chamber 11, a heating tube 12, a pan 16, a plurality of sticks 2, a plurality of fastening pieces 17 and a cover 13. The heating tube 12 is disposed in the cooking chamber 11. The pan 16 is provided and may be placed in an upper portion of the cooking chamber 11. Food may be placed on the pan 16 so as to be cooked by the heating tube 12, whose electricity is supplied by a built-in power supply unit or a power source (not shown in the drawings) from outside of the box 1. The sticks 2 may be provided so that food may be put on these sticks 2 so as to be cooked. Also, the fastening pieces 17 are provided so that food will not move around when these sticks 2 are rotated around. A cover 13 is provided so that the cover may be closed when the box 1 is not in use so as to keep the cooking chamber 11 in a clean condition.

Figure 5:
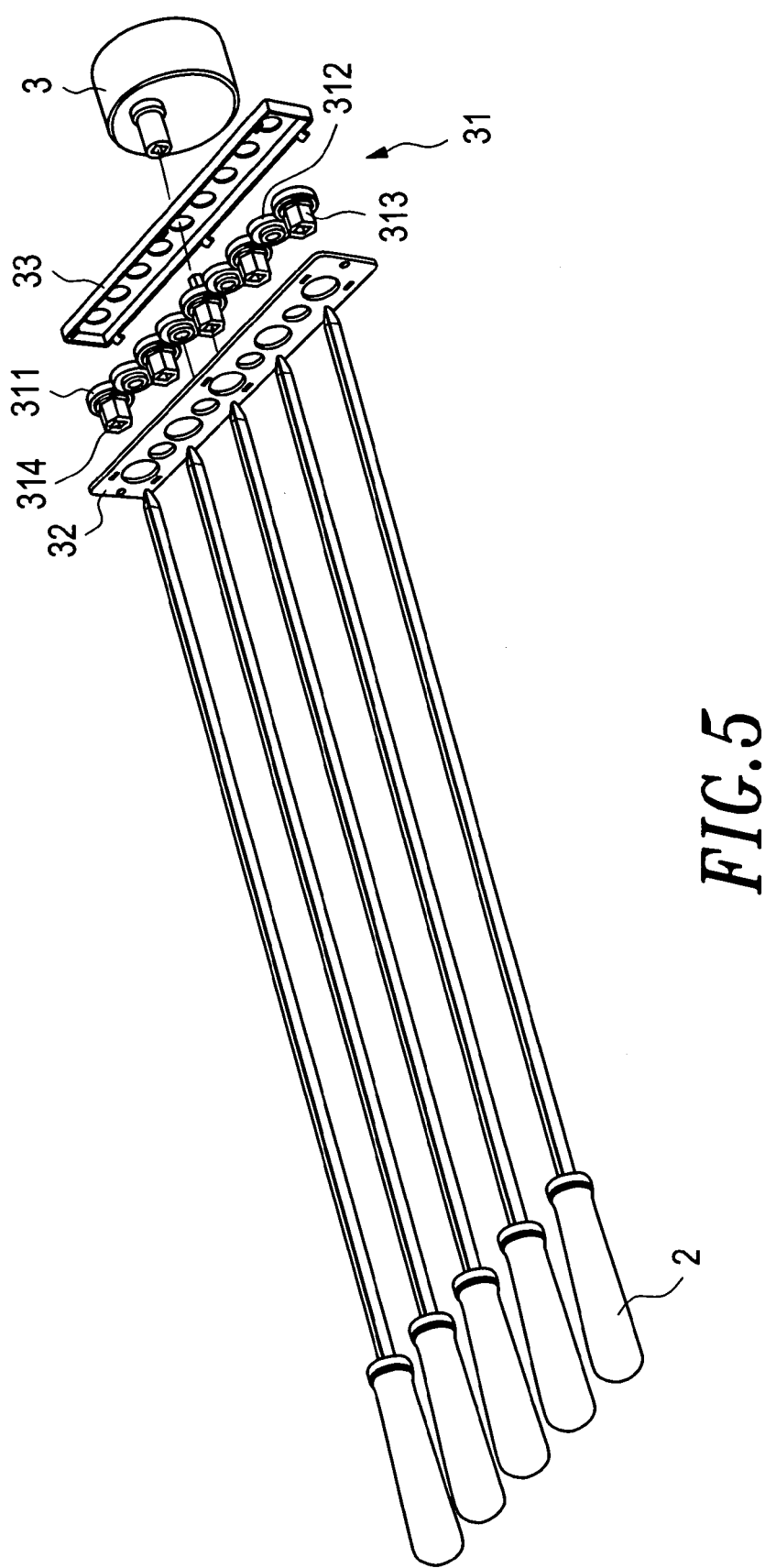
FIG. 5 is an exploded view showing the relative positions of several components of the portable barbecue box of the present invention.
Figure 6:
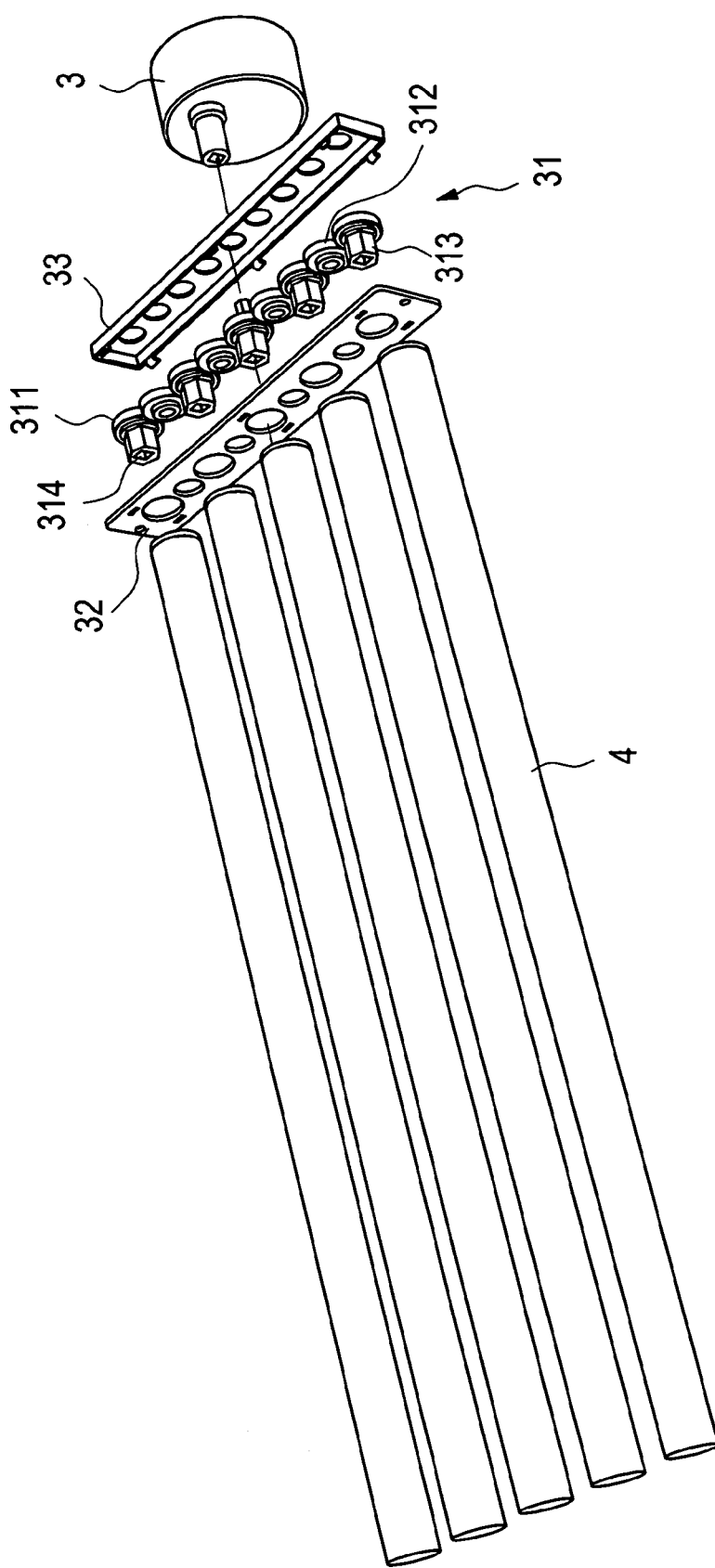
FIG. 6 is another exploded view showing the relative positions of several components of the portable barbecue box of the present invention.

Please refer to FIGS. 5 and 6. A plurality of slots 14 are provided on one side of the cooking chamber 11 and may hold the sticks 2 in place. A compartment 15 is provided by the other side of the cooking chamber 11. A motor 3 is disposed in the compartment 15. The output axle of the motor 3 is connected with a set of cogwheels 31. Two enclosure pieces 32 and 33 are provided so that the cogwheels 31 may be enclosed and properly positioned. The set of cogwheels 31 includes a plurality of cogwheels 311; the cogwheels 311 may mesh with each other or a transmission wheel 312 may be provided between each pair of the cogwheels. A positioning piece 313 is provided on each cogwheel 311 and extends beyond a corresponding hole in the enclosure piece 32. A positioning hole 314 is centrally provided on each positioning piece 313. The proximal end and distal end of each stick 2 may be positioned in a slot 14 and a positioning hole 314, respectively; now, the motor 3 may be turned on to rotate the sticks 2. To ensure a tight fit, the distal end of each stick 2 and each positioning hole 314 has a polygonal shape. A plurality of cylindrical rollers 4 may be provided, and a stick 2 may be placed inside a roller 4. The distal end of each roller 4 may engage with the outer perimeter of a positioning piece 313 so that the motor 3 may be turned on to rotate the sticks 2. Now, food may be placed on top of these rollers 4 so that the food may be cooked evenly.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A portable barbecue box, comprising:
    a cooking chamber, a heating tube being disposed in the cooking chamber;
    a compartment, provided by a side of the cooking chamber, having a motor and a set of cogwheels disposed therein, an output axle of the motor being connected with one of the cogwheels, a positioning piece being formed on each cogwheel and a positioning hole being formed on the positioning piece;
    a plurality of slots provided on an opposite side of the cooking chamber corresponding to the compartment;
    a plurality of sticks, positioned at an upper portion of the cooking chamber, each stick having a proximal end located in one slot and a distal end engaged with and received in the positioning hole of one corresponding positioning piece so that the motor drives the cogwheels to rotate the sticks and food put on the sticks is cooked; and
    a built-in power supply unit or a power source outside of the box for supplying electricity.

2. The portable barbecue box as in claim 1, wherein a cover is provided so that the box can be closed.

3. The portable barbecue box as in claim 1, wherein the cogwheels mesh with each other or a transmission wheel is provided between each pair of the cogwheels.

4. The portable barbecue box as in claim 1, wherein a plurality of cylindrical rollers are provided, and wherein each stick is placed inside one roller and a distal end of each roller engages with the outer perimeter of the positioning piece to receive the positioning piece therein.

5. The portable barbecue box as in claim 1, wherein a pan is provided and is placed at an upper portion of the cooking chamber so that food is placed on the pan to be cooked.

* * * * *